US 12,425,564 B2

(12) United States Patent
Deng et al.

(10) Patent No.: US 12,425,564 B2
(45) Date of Patent: Sep. 23, 2025

(54) INCOMPLETE MULTI-VIEW FUZZY SYSTEM MODELING METHOD BASED ON VISIBLE AND HIDDEN VIEW COLLABORATIVE LEARNING

(71) Applicant: JIANGNAN UNIVERSITY, Wuxi (CN)

(72) Inventors: Zhaohong Deng, Wuxi (CN); Wei Zhang, Wuxi (CN); Shitong Wang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 302 days.

(21) Appl. No.: 18/362,613

(22) Filed: Jul. 31, 2023

(65) Prior Publication Data
US 2024/0267506 A1   Aug. 8, 2024

(30) Foreign Application Priority Data
Feb. 3, 2023   (CN) .......................... 202310071513.0

(51) Int. Cl.
*H04N 13/351*   (2018.01)
*G06V 10/764*   (2022.01)

(52) U.S. Cl.
CPC ......... *H04N 13/351* (2018.05); *G06V 10/764* (2022.01)

(58) Field of Classification Search
CPC .. H04N 13/351; G06V 10/764; G06V 10/806; G06V 10/82; G06V 10/28;
(Continued)

(56) References Cited

U.S. PATENT DOCUMENTS

| 8,515,884 B2* | 8/2013 | Doctor | G06N 3/043 706/15 |
| 8,996,528 B1* | 3/2015 | Long | G06N 7/01 707/754 |

(Continued)

OTHER PUBLICATIONS

"Incomplete Multiple View Fuzzy Inference System With Missing View Imputation and Cooperative Learning"; Wei Zhang, IEEE Transactions on Fuzzy Systems (vol. 30, Issue: 8, 2022, pp. 3038-3051) (Year: 2022).*

(Continued)

*Primary Examiner* — Michael S Osinski
(74) *Attorney, Agent, or Firm* — MUNCY, GEISSLER, OLDS & LOWE, P.C.

(57) ABSTRACT

The present invention belongs to the field of intelligent computing, and particularly relates to an incomplete multi-view fuzzy system modeling method based on visible and hidden view collaborative learning. In the method, in first stage, missing view imputation and common hidden view learning are unified into one framework. In the framework, the learned common hidden view can improve the quality of the imputed multi-view data, and the imputed multi-view data also can be used as a guide for learning the common hidden view, which negotiates with each other and improve each other. In the second stage, the present invention constructs an incomplete multi-view TSK fuzzy system with visible and hidden view collaboration learning. In the system, the imputed multi-view data and the common hidden view data are fully explored. At the same time, collaborative learning enables the system to mine the consistency and complementary information between visible and hidden views.

8 Claims, 2 Drawing Sheets

(58) Field of Classification Search
CPC .......... G06V 20/64; G06N 7/02; G06N 7/023;
G06N 20/00; G06N 3/08; G06N 3/045;
G06N 7/01; G06N 3/047; G06N 3/043;
G06N 5/01; G06F 18/21375; G06F
16/285; G06F 18/214; G06F 18/217;
G06F 18/22; G06F 18/253; G06T
2207/20084; G06T 2207/20081
See application file for complete search history.

(56) References Cited

U.S. PATENT DOCUMENTS

| | | | |
|---|---|---|---|
| 11,366,983 B2* | 6/2022 | Park | G06F 18/214 |
| 2005/0013507 A1* | 1/2005 | Lee | G06V 40/168 |
| | | | 382/284 |
| 2008/0114564 A1* | 5/2008 | Ihara | G06F 16/35 |
| | | | 702/158 |
| 2008/0144946 A1* | 6/2008 | Naccari | G06V 10/56 |
| | | | 382/225 |
| 2015/0254331 A1* | 9/2015 | Long | G06F 16/285 |
| | | | 707/737 |
| 2018/0336438 A1* | 11/2018 | Shi | G10L 17/00 |
| 2020/0074220 A1* | 3/2020 | Zhang | G06V 10/762 |
| 2020/0175161 A1* | 6/2020 | Giaconi | G06N 3/084 |
| 2020/0402300 A1* | 12/2020 | Ding | G06N 3/08 |
| 2021/0150197 A1* | 5/2021 | Kokkinos | G06F 18/253 |
| 2021/0182715 A1* | 6/2021 | Huq | G06N 5/048 |
| 2022/0058827 A1* | 2/2022 | Montserrat | G06V 20/64 |
| 2022/0076063 A1* | 3/2022 | Park | G06V 10/82 |
| 2022/0182672 A1* | 6/2022 | Jung | H04N 19/172 |
| 2022/0318600 A1* | 10/2022 | Mahna | G06N 7/01 |
| 2023/0396753 A1* | 12/2023 | Kim | H04N 13/359 |
| 2024/0330754 A1* | 10/2024 | Unnikrishnan | G06Q 30/0283 |
| 2025/0054164 A1* | 2/2025 | Singh | G06T 7/162 |

OTHER PUBLICATIONS

"End-to-End Incomplete Multiview Fuzzy Clustering With Adaptive Missing View Imputation and Cooperative Learning"; Wei Zhang, IEEE Transactions on Fuzzy Systems (vol. 31, Issue: 5, 2023, pp. 1445-1459) (Year: 2023).*

* cited by examiner

INCOMPLETE MULTI-VIEW FUZZY SYSTEM MODELING METHOD BASED ON VISIBLE AND HIDDEN VIEW COLLABORATIVE LEARNING

TECHNICAL FIELD

The present invention belongs to the field of intelligent computing, and particularly relates to an incomplete multi-view fuzzy system modeling method based on visible and hidden view collaborative learning.

BACKGROUND

In the real world, data often has multiple representations or comes from multiple sources, which is called multi-view or multi-modal data. For example, in a content-based web image search, objects can be represented by the visual features of an image and textual features of the image description.

In order to efficiently mine and utilize multi-view data, a multi-view learning method has been greatly developed in recent years. However, the current multi-view algorithm has two problems. First, both have a common assumption, that is, all views are complete. However, in a real scene, most of the multi-view data is missing. For example, in document clustering, different languages can be considered as different views. But, due to human error, some documents are not fully translated. Another example is in web image retrieval, where text descriptions are not always associated with web images, and some web images may not have associated text. In these scenes, the complementary information among the multi-view becomes very limited, which leads to the traditional multi-view methods being unreliable or unavailable. Second, with the widespread application of machine learning in recent years, an interpretability problem about machine learning has received increasing attention. However, these algorithms focus too much on the performance of the algorithms while neglecting the interpretability of a model.

Several explorations have been made to meet the challenges brought by incomplete multi-view data, and these explorations can be divided into four categories. 1. Discarding all data with missing views, which results in the loss of a large amount of available information. 2. The missing views are imputed by using the existing imputation technology, which can reduce the negative impact of missing views to a certain extent. However, the existing imputation technology can only complete one view at a time, and cannot use the complementary information among the views. In addition, an estimation method may introduce additional estimation errors, thus reducing the data quality. 3. Using subspace learning technology to learn a common view for all views cannot guarantee that the learned common hidden view still has high discrimination under the condition of many missing views. Meanwhile, discarding the original multi-view data and using only the common hidden view modeling will easily result in poor generalization ability of the model. 4.

The incomplete multi-view problem is transformed into a multi-task learning problem by using view alignment and grouping strategy, which can guarantee data utilization better, but can ignore the complementary information among the views. Therefore, incomplete multi-view learning still faces major challenges.

In order to address the problem of model interpretability, two mainstream strategies are proposed. The first uses relatively simple, essentially interpretable models to deal with problems, such as linear models, tree-based models, and rule-based models. The second uses a post-hoc interpretable method, using such methods as visualization and example interpretation to interpret a decision-making process of the model while ensuring the performance of the model. Because a TSK fuzzy system is a rule-based interpretability model and at the same time has a strong data-driven learning ability, it has been widely concerned. In recent years, it has also made great progress in the field of multi-view. However, the current multi-view model based on the TSK is still unable to deal with the incomplete multi-view problem, therefore, how to build an efficient and more transparent model to solve the incomplete multi-view problem is still a challenging task.

SUMMARY

According to the defects in the prior art, the present invention provides an incomplete multi-view fuzzy system modeling method (IMV_TSK) based on visible and hidden view collaborative learning. The present invention firstly designs a new hidden view extraction method, and adaptively integrates the missing view imputation into the process. Then, the present invention designs a new incomplete multi-view fuzzy system modeling method by combining visible and hidden views.

The present invention has the following technical solution:

1. an incomplete multi-view fuzzy system modeling method based on visible and hidden collaborative learning, comprising the following steps:

step one: identifying the number c of classes of incomplete multi-view data $\{X^v \in R^{N \times d^v}, v=1, 2, \ldots, V\}$ for training, the number V of views, the size N of samples, and the feature dimension $d^v$ of each view; and step two: constructing a hidden view extraction module:

2.1 determining an identification matrix $E^v \subset R^{N \times N}$ and a sample weight matrix $W^v \in R^{N \times N}$ according to input incomplete multi-view data, which are defined as follows:

$$E^v_{j,j} = \begin{cases} 1, & \text{if the } j\text{-}th \text{ instance is the } j\text{-}th \text{ missing instance in the } v\text{-}th \text{ view} \\ 0, & \text{ohterwise} \end{cases} \quad (1)$$

$$W^v_{j,j} = \begin{cases} 1, & \text{if } v\text{-}th \text{ view contains } j\text{-}th \text{ instance} \\ w, & \text{otherwise} \end{cases} \quad (2)$$

where w is the weight of the imputed views, which is defined as the percentage of the number of available instances to the total number of instances; and at the same time, the common hidden view $H \in R^{N \times c}$, a basis matrix $B^v \in R^{d^v \times c}$ of each view and an error matrix $U^v \in R^{N \times d^v}$ of each view are initialized, respectively;

2.2 constructing the initialized hidden view to extract an objective function, and calculating the value of the objective function, wherein the target formula is as follows:

$$\min_{H,B,U} \sum_{v=1}^{V} \left\| W^v(X^v(X^v + E^v U^v) - H(B^v)^T) \right\|_F^2 + \beta \|H\|_{2,1} + \gamma \sum_{v=1}^{V} tr(U^T L^v U) \quad (3)$$

-continued s.t. $H \geq 0, B^v \geq 0$ where $L^v = D^v - S^v$ is a Laplacian matrix, $D^v$ is a diagonal matrix, and the ith diagonal element $d_i^v$ thereof is equal to $\Sigma_{j=1}^N S_{i,j}^v$. The first two items of the formula (3) are used for solving the common hidden view and completing the missing views. The second item $$\sum_{v=1}^V tr(U^T L^v U)$$

is used for enabling the reconstructed error matrix to be closer to the real value;

2.3 solving H, $B^v$ and $U^v$ in the formula (3) by using an iterative solution method, wherein the update formula is as follows:

$$H_{i,j} \leftarrow H_{i,j} \frac{\sum_{v=1}^V (\tilde{W}^v X^v B^v + \tilde{W}^v E^v U^v B^v)_{i,j}}{\sum_{v=1}^V (\tilde{W}^v H (B^v)^T B^v + PH)_{i,j}} \quad (4)$$

$$B_{i,j}^v \leftarrow B_{i,j}^v \frac{((X^v)^T \tilde{W}^v H + (U^v)^T (E^v)^T \tilde{W}^v H)_{i,j}}{(B^v H^T \tilde{W}^v H)_{i,j}} \quad (5)$$

$$U^v \leftarrow ((E^v)^T \tilde{W}^v E^v + \gamma L^v)^{-1} (\tilde{W}^v E^v H(B^v)^T) \quad (6)$$

obtaining a locally optimal solution by iterative optimizations (4), (5), and (6) until convergence, and obtaining the optimal $U^v$;

step three: according to the optimal error matrix, imputing the multi-view data according to the following formula:

$$X_{filled}^v = X_{incomplete}^v + E^v U^v \quad (7)$$

step four: having an incomplete multi-view fuzzy system modeling module:

according to the hidden views and the imputed multi-view data acquired from the first two steps, constructing an incomplete multi-view fuzzy system based on visible and hidden collaborative learning in the present invention;

4.1 determining the number K of fuzzy rules, and calculating antecedent parameters $e_i^k$ and $\delta_i^k$ of each view fuzzy system by using a VarPart clustering algorithm;

4.2 projecting multi-view data into the fuzzy space based on the following formula;

$$\mu(x) = \exp\left(\frac{-(x_i - e_i^k)^2}{2\delta_i^k}\right) \quad (8a)$$

$$\tilde{\mu}^k(x) = \frac{\mu^k(x)}{\sum_{k=1}^K \mu^k(x)} \quad (8b)$$

$$x_e = (1, x^T)^T \quad (8c)$$

$$\tilde{x}^k = \tilde{\mu}^k(x) x_e \quad (8d)$$

$$x_g = ((\tilde{x}^1)^T, (\tilde{x}^2)^T, \ldots, (\tilde{x}^K)^T)^T \quad (8e)$$

4.3 constructing the initialized objective function, and calculating the value of the target formula, wherein the objective function is as follows:

$$\min_{P_g, \alpha^v} \sum_{v=1}^V \alpha^v \|W^v(X_g^v P_g^v - Y)\|_2 + \quad (9)$$

$$\alpha^{v+1} \|H_g P_g^{v+1} - Y\|_2 + \lambda_1 \sum_{v=1}^V \|W^v(X_g^v P_g^v - \Lambda^{v+1})\|_2 +$$

$$\lambda_1 \|H_g P_g^{v+1} - \Lambda^{v+1}\|_2 + \lambda_2 \sum_{v=1}^{V+1} \alpha^v \ln \alpha^v + \lambda_3 \sum_{v=1}^{V+1} \|P_g^v\|_2$$

$$s.t. \sum_{v=1}^V \alpha^v = 1, \alpha^v > 0$$

where $X_g^v \in R^{N \times d_g^{v+1}}$ is the mapping of original data $X^v \in R^{N \times d^v}$ in the new feature space by fuzzy rules under the vth view, $H_g \in R^{N \times d_g^{v+1}}$ is the mapping of an original hidden view $H \in R^{N \times c}$ in the new feature space by the fuzzy rules, and $P_g^v$ is a consequent parameter of the vth view; $Y \in [y_1, y_2, \ldots y_N] \in R^{N \times C}$ is a label matrix of the multi-view data, where $y_i \in R^{1 \times C}$ is the label of the ith instance, for example, $y_i=[1, 0, 0]$ indicates that the number of class of the ith multi-view instances $x_i$ is first class; $\alpha^v$ is the weight of each view; $W^v$ is a sample weight matrix of each view, considering that although the missing views are imputed by an imputation method in the previous section, the difference between the imputed views and the real views cannot be measured. The present invention introduces the sample weight matrix to reduce the possibility of large differences resulting in poor model robustness.

Further details of a learning criterion for (9) are explained below:

1) the first two terms $$\sum_{v=1}^V \alpha^v \|W^v(X_g^v P_g^v - Y)\|_2 \text{ and } \alpha^{v+1} \|H_g P_g^{v+1} - Y\|_2$$

are empirical error terms, which are used for training a fuzzy system under each view.

$$\sum_{v=1}^V \|W^v(X_g^v P_g^v - \Lambda^v)\|_2 \text{ and } \|H_g P_g^{v+1} - \Lambda^{v+1}\|_2 \quad 2)$$

are collaborative terms among the views, which are used for ensuring that the outputs of the multi-view are consistent, and for mining mutual information among the views, thereby improving the generalization ability of a training model. Here is $$\Lambda^v = \frac{1}{V} \sum_{l=1, l \neq v}^{V+1} X_g^l P_g^l$$

(for writing convenience, here is $H_g = X_g^{v+1}$)

3) The information contained in different views is different. In order to mine this difference and improve the robustness of the model, the negative Shannon entropy term $$\sum_{v=1}^{V+1} \alpha^v$$

$\ln^{\alpha^v}$ is introduced herein. According to a maximum entropy principle, by minimizing both negative entropy and predicting accuracy loss at the same time, the importance of the views can be balanced adaptively, thereby preventing a certain view from controlling the final output, and finally improving the robustness of the model.

4) The regularization parameters $\lambda_1 > 0$, $\lambda_2 > 0$, $\lambda_3 > 0$ are used for controlling the effects of the corresponding components, which can be manually set or obtained through optimization.

4.4 Formula (9) is a non-convex problem, so the present invention expresses it as a Lagrange function, and then solves it by means of iterative optimization. An updated formula of $P_g^v$ and $\alpha^v$ is given as follows, for writing convenience, setting $\tilde{W}^v (W^v)^T W^v$:

$$P_g^v = [\lambda_3 I_{d^v} + (\alpha + \lambda_1)(X_g^v)^T \tilde{W}^v X_g^v]^{-1} [\alpha (X_g^v)^T \tilde{W}^v Y + \lambda_1 (X_g^v)^T \tilde{W}^v \Lambda^v] \quad (10)$$

$$\alpha^v = \frac{\exp(-\|W^v(X_g^v P_g^v - Y)\|_2 / \lambda_3)}{\sum_{l=1}^{V+1} \exp(-\|W^v(X_g^l P_g^l - Y)\|_2 / \lambda_3)} \quad (11)$$

the value can be converted to the local minimum through iterative optimizations (10) and (11), thereby obtaining the locally optimal solution.

Step five: according to the following objective function, the final output of the incomplete multi-view fuzzy system can be obtained:

$$Y_{output} = \sum_{v=1}^{V} \alpha^v W^v X_g^v P_g^v + \alpha^{V+1} H_g P_g^{V+1} \quad (12)$$

the present invention comprises the following advantages:

1) different from the existing method for simply imputing the missing views or finding the common hidden view for all views, the present invention combines two methods together and completes the data while learning the hidden views. The learned hidden views can promote data imputation, and the imputed multi-view data also can improve the discrimination of the hidden views.

2) The present invention adopts a TSK fuzzy system as a basic model to construct a multi-view classification model with strong interpretability. Finally, all views comprising hidden views are connected together by using collaborative learning. Certain differences and complementary information exist among different views and collaborative learning can mine complementary information among views, reduce differences among views, and finally greatly promote the robustness of the model.

3) The validity of the method herein is verified on multiple real multi-view datasets.

DETAILED DESCRIPTION

The present invention will be described in detail below in combination with the drawings and the embodiments.

Figure 1:
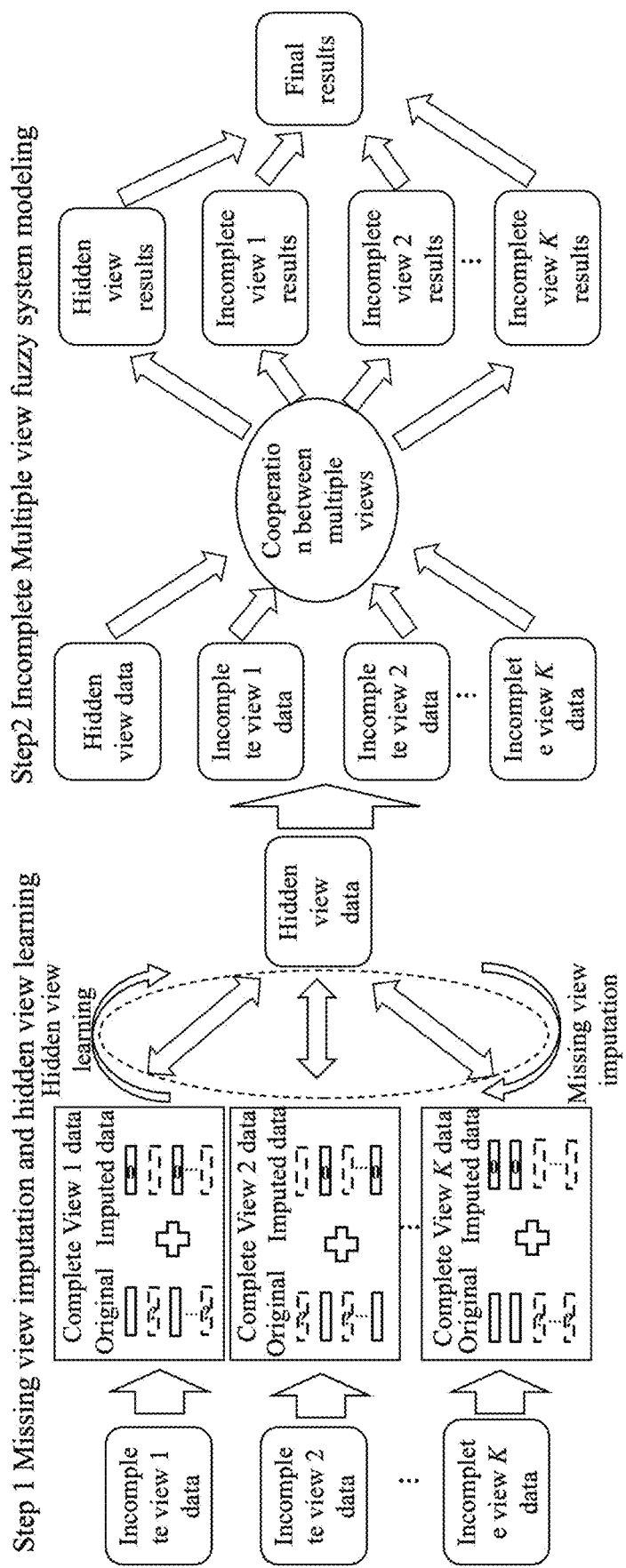
FIG. 1 is an overall structural diagram of an algorithm of the present invention.
Figure 2:
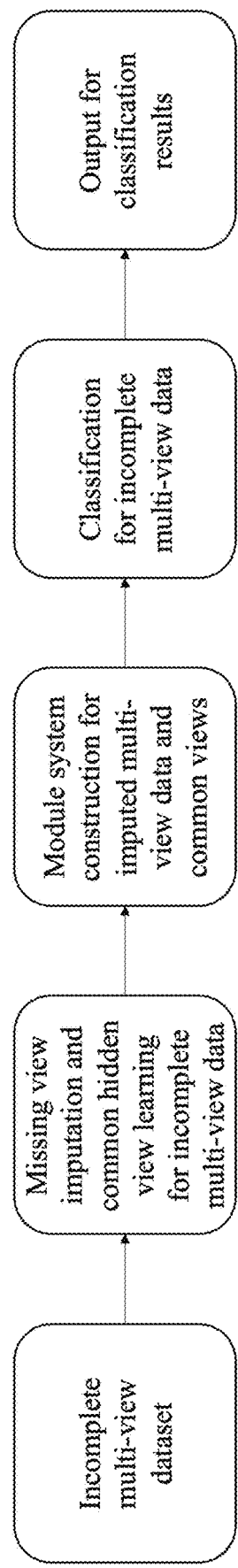
FIG. 2 is a flow chart of the present invention.

As shown in FIGS. 1-2, the present invention realizes an incomplete multi-view fuzzy system modeling method based on visible and hidden view collaborative learning. The method comprises two main stages: missing view imputation and common hidden view learning, and incomplete multi-view fuzzy system modeling. In the first stage of the present invention, the missing view imputation and common hidden view learning are integrated into one framework based on multi-view matrix factorization technology, so that the two parts negotiate with each other to acquire the optimal imputed multi-view data and the common hidden view. In the second stage, the present invention constructs an incomplete multi-view fuzzy system based on a traditional TSK fuzzy system for the imputed multi-view data and the hidden views. In this process, the present invention realizes the optimal multi-view data mining through collaborative learning and Shannon entropy.

TABLE 1

Statistical Information on Data Set

| Data Set | Number of Samples | Number of Views/Dimension | Number of Classes |
| --- | --- | --- | --- |
| Dermatology | 366 | 2(22-12) | 6 |
| Image Segmentation | 2310 | 2(10-9) | 7 |
| Forest Type | 326 | 2(18-9) | 4 |
| Corel Images | 1000 | 2(300-256) | 10 |
| ionosphere | 351 | 2(34-25) | 2 |
| Epileptic EEG | 500 | 2(20-6) | 2 |
| Caltech7 | 1474 | 3(48-40-254) | 7 |

Embodiment 1

1. an incomplete multi-view fuzzy system modeling method based on visible and hidden collaborative learning, comprising the following steps:

step one: identifying the number c of classes of incomplete multi-view data for training, the number V of views, the size N of samples, and the feature dimension d' of each view; and step two: constructing hidden views to extract an objective function and extract hidden views, and imputing missing views;

step three: imputing the missing views according to an optimal error matrix acquired in step two;

step four: projecting multi-view data into fuzzy space, and constructing an objective function of an incomplete multi-view fuzzy system and solving;

step five: acquiring the final classification results.

In embodiment 1, the present invention uses seven public multi-view data for model construction and evaluation, and the specific data set information is shown in Table 1.

Table 2 to Table 8 summarizes the classification accuracy of the present invention and thirteen advanced incomplete multi-view classification algorithms in seven datasets. By observing Table 2 to Table 8, it can be concluded that: (1) the effect of only replacing the missing views with a value of 0 is worse in most cases compared to other imputing methods. (2) In the case of fewer missing views, the imputation strategy will play a certain role, while when the proportion of missing is large, the effectiveness of the imputation strategy is greatly reduced. For example, in a Dermatology data set, AMVMED (SVT) and other methods are more effective when the proportion of missing views is 10% and 30%. When the proportion of the missing views is 90%, the performance of this algorithm is different from that of IMV_TSK. (3) Similarly, because an IMSF algorithm adopts a grouping strategy, when the proportion of missing is less, the model can utilize information on the multi-view; while when the proportion of the missing is larger, the model can utilize less information on the multi-view, resulting in poor performance. At the same time, raw data is divided into several groups, therefore, the training data for each group is less in the case of a large number of categories, resulting in poor performance of IMSF. For example, IMSF performs better on binary classification data sets such as Epileptic EEG and Ionosphere, while the effect on multi-classification data sets such as Image Segmentation and Forest Type is poor. (4) In most cases, the performance of IMG, IMC_GRMF, DAIMC, and other algorithms is not excellent, which proves that simply using the common hidden view of mining for classification modeling will lead to poor model performance. (5) It can be seen that the IMV_TSK uses complementary information among views to complete the data, therefore, IMV_TSK performs better than other algorithms in most cases. In addition, because the IMV_TSK uses the common hidden view, the maximization for data utilization is realized. Therefore, the performance of the IM_TSK is still better even in the case of a larger missing rate.

TABLE 2

Classification Accuracy (Mean ± Variance)
of Twelve Algorithms on Dermatology Dataset

| Algorithms | Dermatology | | | | |
| --- | --- | --- | --- | --- | --- |
|  | 10% | 30% | 50% | 70% | 90% |
| TwoV-TSKFS (Zero) | 0.8190 ± 0.042 | 0.7814 ± 0.032 | 0.7192 ± 0.044 | 0.6162 ± 0.018 | 0.6246 ± 0.047 |
| TwoV-TSKFS (Mean) | 0.8115 ± 0.021 | 0.7842 ± 0.033 | 0.7609 ± 0.043 | 0.7069 ± 0.026 | 0.6673 ± 0.046 |
| TwoV-TSKFS (KNN) | 0.7903 ± 0.038 | 0.7582 ± 0.028 | 0.6898 ± 0.059 | 0.6148 ± 0.016 | 0.5649 ± 0.012 |
| TwoV-TSKFS (SVT) | 0.8026 ± 0.052 | 0.7438 ± 0.053 | 0.7192 ± 0.023 | 0.7015 ± 0.046 | 0.6387 ± 0.051 |
| AMVMED(Zero) | 0.9014 ± 0.005 | 0.8401 ± 0.003 | 0.7994 ± 0.012 | 0.7979 ± 0.024 | 0.7767 ± 0.008 |
| AMVMED(Mean) | 0.9253 ± 0.014 | 0.8656 ± 0.007 | 0.8424 ± 0.008 | 0.8147 ± 0.005 | 0.8024 ± 0.008 |
| AMVMED(KNN) | 0.9155 ± 0.010 | 0.8725 ± 0.010 | 0.8336 ± 0.000 | 0.8129 ± 0.012 | 0.7803 ± 0.020 |
| AMVMED(SVT) | 0.8916 ± 0.007 | 0.8730 ± 0.006 | 0.8377 ± 0.030 | 0.8144 ± 0.023 | 0.7698 ± 0.013 |
| iMSF | 0.9456 ± 0.036 | 0.8439 ± 0.026 | 0.8198 ± 0.060 | 0.7117 ± 0.036 | 0.6937 ± 0.054 |
| IMG | 0.9459 ± 0.003 | 0.9333 ± 0.005 | 0.9315 ± 0.017 | 0.8793 ± 0.041 | 0.8603 ± 0.030 |
| IMC_GRMF | 0.9608 ± 0.004 | 0.9381 ± 0.006 | 0.9162 ± 0.001 | 0.8890 ± 0.006 | 0.8625 ± 0.006 |
| DAIMC | 0.9268 ± 0.021 | 0.8934 ± 0.013 | 0.8598 ± 0.043 | 0.8224 ± 0.055 | 0.7795 ± 0.036 |
| IMV_TSK | 0.9836 ± 0.017 | 0.9536 ± 0.012 | 0.9453 ± 0.026 | 0.9327 ± 0.015 | 0.9042 ± 0.039 |

TABLE 3

Classification Accuracy (Mean ± Variance)
of Twelve Algorithms on Image Segmentation Dataset

| Algorithms | Image Segmentation | | | | |
| --- | --- | --- | --- | --- | --- |
|  | 10% | 30% | 50% | 70% | 90% |
| TwoV-TSKFS (Zero) | 0.7475 ± 0.036 | 0.7068 ± 0.029 | 0.6479 ± 0.003 | 0.6016 ± 0.055 | 0.5503 ± 0.004 |
| TwoV-TSKFS (Mean) | 0.7669 ± 0.035 | 0.7368 ± 0.035 | 0.6604 ± 0.003 | 0.6321 ± 0.033 | 0.5622 ± 0.002 |
| TwoV-TSKFS (KNN) | 0.7566 ± 0.015 | 0.7259 ± 0.041 | 0.6843 ± 0.006 | 0.6356 ± 0.025 | 0.5706 ± 0.003 |
| TwoV-TSKFS (SVT) | 0.7649 ± 0.005 | 0.7267 ± 0.043 | 0.6748 ± 0.035 | 0.6328 ± 0.018 | 0.5712 ± 0.002 |
| AMVMED (Zero) | 0.8718 ± 0.005 | 0.7975 ± 0.006 | 0.7429 ± 0.010 | 0.6939 ± 0.014 | 0.6452 ± 0.001 |

TABLE 3-continued

Classification Accuracy (Mean ± Variance)
of Twelve Algorithms on Image Segmentation Dataset

| | Image Segmentation | | | | |
|---|---|---|---|---|---|
| Algorithms | 10% | 30% | 50% | 70% | 90% |
| AMVMED (Mean) | 0.8765 ± 0.004 | 0.8095 ± 0.018 | 0.7624 ± 0.014 | 0.7074 ± 0.013 | 0.6810 ± 0.015 |
| AMVMED (KNN) | 0.8807 ± 0.004 | 0.8043 ± 0.009 | 0.7434 ± 0.009 | 0.7152 ± 0.006 | 0.6605 ± 0.007 |
| AMVMED (SVT) | 0.8729 ± 0.001 | 0.8131 ± 0.007 | 0.7588 ± 0.010 | 0.6988 ± 0.006 | 0.6411 ± 0.015 |
| iMSF | 0.7695 ± 0.035 | 0.7392 ± 0.016 | 0.6840 ± 0.014 | 0.6210 ± 0.003 | 0.5720 ± 0.018 |
| IMG | 0.7152 ± 0.021 | 0.6958 ± 0.004 | 0.6503 ± 0.031 | 0.6123 ± 0.016 | 0.5961 ± 0.051 |
| IMC_GRMF | 0.7432 ± 0.011 | 0.6928 ± 0.004 | 0.6843 ± 0.012 | 0.6495 ± 0.013 | 0.6170 ± 0.002 |
| DAIMC | 0.8080 ± 0.043 | 0.7369 ± 0.056 | 0.6687 ± 0.047 | 0.6137 ± 0.048 | 0.5746 ± 0.052 |
| IMV_TSK | 0.8970 ± 0.014 | 0.8390 ± 0.019 | 0.7874 ± 0.016 | 0.7303 ± 0.015 | 0.7087 ± 0.016 |

TABLE 4

Classification Accuracy (Mean ± Variance)
of Twelve Algorithms on Forest Type Dataset

| | Forest Type | | | | |
|---|---|---|---|---|---|
| Algorithms | 10% | 30% | 50% | 70% | 90% |
| TwoV-TSKFS (Zero) | 0.7657 ± 0.051 | 0.7533 ± 0.023 | 0.6874 ± 0.069 | 0.6372 ± 0.058 | 0.5402 ± 0.053 |
| TwoV-TSKFS (Mean) | 0.7734 ± 0.017 | 0.7581 ± 0.006 | 0.7127 ± 0.029 | 0.7013 ± 0.060 | 0.6008 ± 0.029 |
| TwoV-TSKFS (KNN) | 0.7868 ± 0.030 | 0.7056 ± 0.029 | 0.6955 ± 0.021 | 0.6195 ± 0.052 | 0.5167 ± 0.021 |
| TwoV-TSKFS (SVT) | 0.7811 ± 0.021 | 0.7800 ± 0.015 | 0.7591 ± 0.036 | 0.6898 ± 0.049 | 0.5421 ± 0.035 |
| AMVMED(Zero) | 0.8504 ± 0.007 | 0.8297 ± 0.018 | 0.8192 ± 0.008 | 0.7903 ± 0.028 | 0.7787 ± 0.004 |
| AMVMED(Mean) | 0.8634 ± 0.002 | 0.8422 ± 0.004 | 0.8432 ± 0.004 | 0.8403 ± 0.008 | 0.8279 ± 0.032 |
| AMVMED(KNN) | 0.8665 ± 0.004 | 0.8491 ± 0.009 | 0.8364 ± 0.004 | 0.8370 ± 0.010 | 0.8332 ± 0.003 |
| AMVMED(SVT) | 0.8638 ± 0.011 | 0.8174 ± 0.018 | 0.8031 ± 0.004 | 0.7945 ± 0.022 | 0.7725 ± 0.010 |
| iMSF | 0.8266 ± 0.029 | 0.7924 ± 0.047 | 0.7722 ± 0.034 | 0.7089 ± 0.045 | 0.6899 ± 0.042 |
| IMG | 0.8471 ± 0.022 | 0.8337 ± 0.015 | 0.8146 ± 0.032 | 0.8069 ± 0.016 | 0.7940 ± 0.032 |
| IMC_GRMF | 0.7340 ± 0.010 | 0.6928 ± 0.003 | 0.6843 ± 0.011 | 0.6495 ± 0.013 | 0.6170 ± 0.002 |
| DAIMC | 0.8343 ± 0.006 | 0.8184 ± 0.010 | 0.8171 ± 0.013 | 0.8069 ± 0.011 | 0.7681 ± 0.029 |
| IMV_TSK | 0.8892 ± 0.029 | 0.8796 ± 0.031 | 0.8758 ± 0.038 | 0.8565 ± 0.024 | 0.8490 ± 0.002 |

TABLE 5

Classification Accuracy (Mean ± Variance)
of Twelve Algorithms on Epileptic EEG Dataset

| | Epileptic EEG | | | | |
|---|---|---|---|---|---|
| Algorithms | 10% | 30% | 50% | 70% | 90% |
| TwoV-TSKFS (Zero) | 0.8465 ± 0.022 | 0.8173 ± 0.018 | 0.7903 ± 0.032 | 0.7523 ± 0.033 | 0.7290 ± 0.020 |
| TwoV-TSKFS (Mean) | 0.8590 ± 0.023 | 0.8300 ± 0.034 | 0.7950 ± 0.022 | 0.7820 ± 0.034 | 0.7335 ± 0.071 |

TABLE 5-continued

Classification Accuracy (Mean ± Variance)
of Twelve Algorithms on Epileptic EEG Dataset Epileptic EEG

| Algorithms | 10% | 30% | 50% | 70% | 90% |
|---|---|---|---|---|---|
| TwoV-TSKFS (KNN) | 0.8355 ± 0.020 | 0.8145 ± 0.026 | 0.7720 ± 0.045 | 0.7175 ± 0.044 | 0.7055 ± 0.036 |
| TwoV-TSKFS (SVT) | 0.8540 ± 0.024 | 0.8295 ± 0.049 | 0.8155 ± 0.024 | 0.7990 ± 0.028 | 0.7680 ± 0.044 |
| AMVMED(Zero) | 0.8933 ± 0.003 | 0.8513 ± 0.007 | 0.8210 ± 0.008 | 0.7822 ± 0.008 | 0.7670 ± 0.011 |
| AMVMED(Mean) | 0.8927 ± 0.006 | 0.8802 ± 0.016 | 0.8563 ± 0.013 | 0.8375 ± 0.017 | 0.8157 ± 0.015 |
| AMVMED(KNN) | 0.9100 ± 0.003 | 0.8673 ± 0.011 | 0.8305 ± 0.019 | 0.8243 ± 0.019 | 0.7947 ± 0.004 |
| AMVMED(SVT) | 0.9063 ± 0.006 | 0.8548 ± 0.000 | 0.8188 ± 0.013 | 0.7745 ± 0.007 | 0.7650 ± 0.024 |
| iMSF | 0.9117 ± 0.026 | 0.8675 ± 0.011 | 0.8212 ± 0.011 | 0.8146 ± 0.004 | 0.7704 ± 0.013 |
| IMG | 0.8120 ± 0.026 | 0.7000 ± 0.046 | 0.6980 ± 0.033 | 0.6880 ± 0.030 | 0.6980 ± 0.004 |
| IMC_GRMF | 0.8027 ± 0.004 | 0.7720 ± 0.009 | 0.7393 ± 0.007 | 0.7013 ± 0.008 | 0.6547 ± 0.007 |
| DAIMC | 0.6540 ± 0.002 | 0.6533 ± 0.031 | 0.6307 ± 0.022 | 0.6347 ± 0.018 | 0.6167 ± 0.024 |
| IMV_TSK | 0.9360 ± 0.014 | 0.8800 ± 0.036 | 0.8720 ± 0.003 | 0.8440 ± 0.032 | 0.8100 ± 0.004 |

TABLE 6

Classification Accuracy (Mean ± Variance)
of Twelve Algorithms on Ionosphere Dataset Ionosphere

| Algorithms | 10% | 30% | 50% | 70% | 90% |
|---|---|---|---|---|---|
| Two V-TSKFS (Zero) | 0.8198 ± 0.072 | 0.8120 ± 0.061 | 0.7785 ± 0.033 | 0.7543 ± 0.058 | 0.7272 ± 0.065 |
| TwoV-TSKFS (Mean) | 0.8597 ± 0.037 | 0.8006 ± 0.034 | 0.7956 ± 0.068 | 0.7813 ± 0.38 | 0.7457 ± 0.037 |
| TwoV-TSKFS (KNN) | 0.8197 ± 0.026 | 0.8019 ± 0.033 | 0.7857 ± 0.061 | 0.7301 ± 0.037 | 0.7202 ± 0.061 |
| TwoV-TSKFS (SVT) | 0.8390 ± 0.034 | 0.8191 ± 0.041 | 0.8055 ± 0.038 | 0.7401 ± 0.046 | 0.7179 ± 0.047 |
| AMVMED(Zero) | 0.9870 ± 0.004 | 0.9482 ± 0.004 | 0.9339 ± 0.008 | 0.9155 ± 0.003 | 0.8957 ± 0.004 |
| AMVMED(Mean) | 0.9888 ± 0.004 | 0.9653 ± 0.002 | 0.9499 ± 0.004 | 0.9257 ± 0.012 | 0.8985 ± 0.012 |
| AMVMED(KNN) | 0.9829 ± 0.005 | 0.9615 ± 0.006 | 0.9325 ± 0.009 | 0.9110 ± 0.013 | 0.9081 ± 0.023 |
| AMVMED(SVT) | 0.9865 ± 0.007 | 0.9694 ± 0.009 | 0.9308 ± 0.014 | 0.9081 ± 0.028 | 0.8946 ± 0.023 |
| iMSF | 0.9497 ± 0.014 | 0.9308 ± 0.002 | 0.8931 ± 0.034 | 0.8711 ± 0.014 | 0.8239 ± 0.002 |
| IMG | 0.8634 ± 0.037 | 0.7807 ± 0.024 | 0.7778 ± 0.023 | 0.7352 ± 0.042 | 0.7266 ± 0.038 |
| IMC_GRMF | 0.8509 ± 0.005 | 0.8119 ± 0.012 | 0.8008 ± 0.012 | 0.7863 ± 0.014 | 0.7618 ± 0.006 |
| DAIMC | 0.8328 ± 0.010 | 0.8158 ± 0.019 | 0.8091 ± 0.017 | 0.8002 ± 0.018 | 0.7720 ± 0.038 |
| IMV_TSK | 0.9857 ± 0.006 | 0.9714 ± 0.012 | 0.9572 ± 0.037 | 0.9373 ± 0.021 | 0.9088 ± 0.003 |

TABLE 7

Classification Accuracy (Mean ± Variance)
of Twelve Algorithms on Corel Images Dataset

| | Corel Images | | | | |
|---|---|---|---|---|---|
| Algorithms | 10% | 30% | 50% | 70% | 90% |
| TwoV-TSKFS (Zero) | 0.3170 ± 0.030 | 0.2590 ± 0.080 | 0.2403 ± 0.083 | 0.1873 ± 0.082 | 0.1483 ± 0.067 |
| TwoV-TSKFS (Mean) | 0.3062 ± 0.009 | 0.2775 ± 0.033 | 0.2508 ± 0.034 | 0.2393 ± 0.020 | 0.1945 ± 0.020 |
| TwoV-TSKFS (KNN) | 0.2753 ± 0.099 | 0.1990 ± 0.089 | 0.1835 ± 0.058 | 0.1550 ± 0.073 | 0.1448 ± 0.036 |
| TwoV-TSKFS (SVT) | 0.3185 ± 0.015 | 0.2027 ± 0.091 | 0.1695 ± 0.093 | 0.1828 ± 0.077 | 0.1362 ± 0.048 |
| AMVMED(Zero) | 0.5215 ± 0.012 | 0.4850 ± 0.013 | 0.4370 ± 0.016 | 0.4110 ± 0.014 | 0.4008 ± 0.009 |
| AMVMED(Mean) | 0.5325 ± 0.025 | 0.4838 ± 0.015 | 0.4578 ± 0.016 | 0.4277 ± 0.018 | 0.4125 ± 0.018 |
| AMVMED(KNN) | 0.5270 ± 0.008 | 0.4843 ± 0.025 | 0.4563 ± 0.017 | 0.4197 ± 0.006 | 0.4010 ± 0.019 |
| AMVMED(SVT) | 0.5253 ± 0.008 | 0.4870 ± 0.027 | 0.4300 ± 0.010 | 0.4045 ± 0.019 | 0.3913 ± 0.020 |
| iMSF | 0.5714 ± 0.000 | 0.4795 ± 0.037 | 0.3643 ± 0.028 | 0.3355 ± 0.023 | 0.3311 ± 0.008 |
| IMG | 0.4720 ± 0.026 | 0.4790 ± 0.025 | 0.4420 ± 0.018 | 0.4320 ± 0.013 | 0.4750 ± 0.038 |
| IMC_GRMF | 0.5033 ± 0.007 | 0.4757 ± 0.006 | 0.4583 ± 0.010 | 0.4376 ± 0.003 | 0.4203 ± 0.003 |
| DAIMC | 0.4697 ± 0.001 | 0.4477 ± 0.014 | 0.4313 ± 0.005 | 0.4130 ± 0.004 | 0.3850 ± 0.007 |
| IMV_TSK | 0.6590 ± 0.015 | 0.6200 ± 0.052 | 0.5900 ± 0.020 | 0.5720 ± 0.032 | 0.5600 ± 0.034 |

TABLE 8

Classification Accuracy (Mean ± Variance)
of Twelve Algorithms on Caltech7 Dataset

| | Caltech7 | | | | |
|---|---|---|---|---|---|
| Algorithms | 10% | 30% | 50% | 70% | 90% |
| TwoV-TSKFS (Zero) | 0.7646 ± 0.005 | 0.7524 ± 0.008 | 0.7524 ± 0.022 | 0.6845 ± 0.007 | 0.6452 ± 0.009 |
| TwoV-TSKFS (Mean) | 0.7802 ± 0.015 | 0.7659 ± 0.006 | 0.7212 ± 0.027 | 0.6776 ± 0.016 | 0.6228 ± 0.087 |
| TwoV-TSKFS (KNN) | 0.7863 ± 0.009 | 0.7714 ± 0.017 | 0.7449 ± 0.030 | 0.7391 ± 0.011 | 0.5590 ± 0.008 |
| TwoV-TSKFS (SVT) | 0.7563 ± 0.016 | 0.7490 ± 0.019 | 0.7293 ± 0.021 | 0.6744 ± 0.031 | 0.6839 ± 0.033 |
| AMVMED(Zero) | 0.7503 ± 0.021 | 0.6974 ± 0.023 | 0.6676 ± 0.019 | 0.6025 ± 0.028 | 0.5529 ± 0.011 |
| AMVMED(Mean) | 0.7666 ± 0.026 | 0.7571 ± 0.020 | 0.7375 ± 0.024 | 0.7205 ± 0.039 | 0.7165 ± 0.004 |
| AMVMED(KNN) | 0.7788 ± 0.017 | 0.7551 ± 0.029 | 0.7374 ± 0.022 | 0.7286 ± 0.035 | 0.7096 ± 0.019 |
| AMVMED(SVT) | 0.7564 ± 0.032 | 0.7178 ± 0.022 | 0.6737 ± 0.026 | 0.6269 ± 0.021 | 0.5882 ± 0.014 |
| iMSF | 0.8743 ± 0.018 | 0.8593 ± 0.005 | 0.8164 ± 0.033 | 0.7931 ± 0.016 | 0.7269 ± 0.054 |
| IMG | 0.8630 ± 0.006 | 0.8514 ± 0.006 | 0.8636 ± 0.011 | 0.8182 ± 0.007 | 0.7062 ± 0.006 |
| IMC_GRMF | 0.8157 ± 0.003 | 0.8044 ± 0.004 | 0.7959 ± 0.010 | 0.7918 ± 0.002 | 0.7900 ± 0.018 |
| DAIMC | 0.8449 ± 0.012 | 0.8352 ± 0.014 | 0.8300 ± 0.010 | 0.8249 ± 0.010 | 0.8162 ± 0.013 |
| IMV_TSK | 0.9254 ± 0.009 | 0.9213 ± 0.026 | 0.9084 ± 0.018 | 0.8996 ± 0.015 | 0.8876 ± 0.014 |

TABLE 9

Classification Accuracy (Mean ± Variance) of IMV_TSK1,
IMV_TSK2 and IMV_TSK on Seven Datasets

| Datasets | IMV_TSK1 | IMV_TSK2 | IMV_TSK |
|---|---|---|---|
| Dermatology | 0.9454 ± 0.027 | 0.9426 ± 0.030 | 0.9536 ± 0.012 |
| Image Segmentation | 0.8087 ± 0.035 | 0.7593 ± 0.028 | 0.8390 ± 0.019 |
| Forest Type | 0.8565 ± 0.016 | 0.8009 ± 0.059 | 0.8796 ± 0.031 |
| Corel Images | 0.6090 ± 0.024 | 0.6170 ± 0.023 | 0.6200 ± 0.052 |
| Epileptic EEG | 0.8960 ± 0.011 | 0.9100 ± 0.034 | 0.8800 ± 0.036 |
| Caltech7 | 0.9145 ± 0.012 | 0.9199 ± 0.016 | 0.9213 ± 0.026 |
| Ionosphere | 0.9645 ± 0.072 | 0.9613 ± 0.012 | 0.9714 ± 0.012 |

Embodiment 2

The present invention continues to analyze the effectiveness of the imputation of the hidden views and missing views when the proportion of missing views is 30%. Denoting IMV_TSK without hidden view as IMV_TSK1, and denoting IMV_TSK without using the imputation approach of the proposed method but mean imputation to fill the missing views as IMV_TSK2. Table 9 gives the classification accuracy of IMV_TSK1, IMV_TSK2, and IMV_TSK.

It can be clearly seen that IMV_TSK is superior to IMV_TSK1 and IMV_TSK2 on most datasets, especially on an Image Segmentation data set and a Forest Type data set, which illustrates the effectiveness of the hidden view and the missing view imputation approach in IMV_TSK. By comparing IMV_TSK with IMV_TSK1, the results show that hidden view information is very useful to improve the classification performance of multi-view data. In addition, by comparing IMV_TSK with IMV_TSK2, the corresponding results show that the hidden view assisted missing view imputation technology has advantages over traditional imputation technology.

The invention claimed is:

1. An incomplete multi-view fuzzy system modeling method based on visible and hidden view collaborative learning, comprising the following steps:
step one: identifying the number c of classes of incomplete multi-view data $\{x^v \in R^{N \times d^v}, v=1, 2, \ldots, V\}$ for training, the number V of views, the size N of samples, and the feature dimension $d^v$ of each view;
step two: constructing an objective function to extract a common view, and to impute missing views;
(2.1) determining an identification matrix $E^v \in R^{N \times N}$ and a sample weight matrix $W^v \in R^{N \times N}$ according to input incomplete multi-view data, which are defined as follows:

$$E_{j,j}^v = \begin{cases} 1, & \text{if the } j\text{-th instance is the } j\text{-th missing instance in the } v\text{-th view} \\ 0, & \text{otherwise} \end{cases} \quad (1)$$

$$W_{j,j}^v = \begin{cases} 1, & \text{if } v\text{-th view contains } j\text{-th instance} \\ w, & \text{otherwise} \end{cases} \quad (2)$$

where w indicates the weight of imputed instance, which is defined as the percentage of the number of available instances to the total number of instances; and at the same time, a common hidden view $H \in R^{N \times c}$, a basis matrix $B^v \in R^{d^v \times c}$ of each view and an error matrix $U^v \in R^{N \times d^v}$ of each view are initialized, respectively;

(2.2) constructing the common hidden view learning objective function and computing the objective function value; the objective function is defined as follows:

$$\min_{H,B,U} \sum_{v=1}^{V} \left\| W^v(X^v + E^v U^v) - H(B^v)^T \right\|_F^2 + \beta \|H\|_{2,1} + \gamma \sum_{v=1}^{V} tr(U^T L^v U) \quad (3)$$

$$\text{s.t. } H \geq 0, B^v \geq 0$$

where $L^v = D^v - S^v$ is a Laplacian matrix, $D^v$ is a diagonal matrix, and the ith diagonal element $d_i^v$ thereof is equal to $E_{j=1}^{N} S_{i,j}^v$; the first two terms of the formula (3) are used for solving the common hidden view and imputing the missing views; and the second item $$\sum_{v=1}^{V} tr(U^T L^v U)$$

is used for enabling a reconstructed error matrix to be closer to a real value;

(2.3) solving H, $B^v$ and $U^v$ in the formula (3) by using an iterative solution method, wherein an update function is as follows:

$$H_{i,j} \leftarrow H_{i,j} \frac{\sum_{v=1}^{V}(\tilde{W}^v X^v B^v + \tilde{W}^v E^v U^v B^v)_{i,j}}{\sum_{v=1}^{V}(\tilde{W}^v H(B^v)^T B^v + PH)_{i,j}} \quad (4)$$

$$B_{i,j}^v \leftarrow B_{i,j}^v \frac{((X^v)^T \tilde{W}^v H + (U^v)^T (E^v)^T \tilde{W}^v H)_{i,j}}{(B^v H^T \tilde{W}^v H)_{i,j}} \quad (5)$$

$$U^v \leftarrow ((E^v)^T \tilde{W}^v E^v + \gamma L^v)^{-1} (\tilde{W}^v E^v H(B^v)^T) \quad (6)$$

obtaining a locally optimal solution by iterative optimizations (4), (5), and (6) until convergence, and obtaining the optimal optimal $U^v$;
step three: imputing the missing views according to the optimal error matrix acquired in step two;
step four: mapping imputed multi-view data into fuzzy space, and constructing an objective function of an incomplete multi-view fuzzy system and solving; and
step five: obtaining final classification results.

2. The incomplete multi-view fuzzy system modeling method with visible and hidden view collaborative learning of claim 1, wherein step three specifically comprises: according to an optimal error matrix, imputing the multi-view data according to the following function;

$$X_{filled}^v = X_{incomplete}^v + E^v U^v. \quad (7)$$

3. The incomplete multi-view fuzzy system modeling method based on visible and hidden view collaborative learning of claim 1, wherein step four specifically comprises:
according to the acquired hidden view and the imputed multi-view data, constructing an incomplete multi-view fuzzy system with collaborative learning in the present invention;
(3.1) determining the number K of fuzzy rules, and calculating antecedent parameters $e_i^k$ and $\delta_i^k$ of each view fuzzy system by using a VarPart clustering algorithm;

(3.2) mapping multi-view data into the fuzzy space based on the following function;

$$\mu(x) = \exp\left(\frac{-(x_i - e_i^k)^2}{2\delta_i^k}\right) \quad (8a)$$

$$\tilde{\mu}^k(x) = \frac{\mu^k(x)}{\sum_{k'=1}^{K} \mu^{k'}(x)} \quad (8b)$$

$$x_e = (1, x^T)^T \quad (8c)$$

$$\tilde{x}^k = \tilde{\mu}^k(x) x_e \quad (8d)$$

$$x_g = ((\tilde{x}^1)^T, (\tilde{x}^2)^T, \ldots, (\tilde{x}^K)^T)^T \quad (8e)$$

(3.3) Constructing the following objective function, and calculating the value of the objective function:

$$\min_{P_g, \alpha^v} \sum_{v=1}^{V} \alpha^v \|W^v(X_g^v P_g^v - Y)\|_2 + \quad (9)$$

$$\alpha^{V+1} \|H_g P_g^{V+1} - Y\|_2 + \lambda_1 \sum_{v=1}^{V} \|W^v(X_g^v P_g^v - \Lambda^{v+1})\|_2 +$$

$$\lambda_1 \|H_g P_g^{V+1} - \Lambda^{V+1}\|_2 + \lambda_2 \sum_{v=1}^{V+1} \alpha^v \ln \alpha^v + \lambda_3 \sum_{v=1}^{V+1} \|P_g^v\|_2$$

$$\text{s.t.} \sum_{v=1}^{V} \alpha^v = 1, \alpha^v > 0$$

where $X_g^v \in R^{N \times d_g^v}$ is the mapping of original data $X^v \in R^{N \times d^v}$ in the new feature space by fuzzy rules under the vth view, $H_g \in R^{N \times d_g^{v+1}}$ is the mapping of an original hidden view $H \in R^{N \times c}$ in the new feature space by the fuzzy rules, and $P_g^v$ is a consequent parameter of the vth view; $Y \in [y_1, y_2, \ldots y_N] \in R^{N \times c}$ is a label matrix of the multi-view data, where $y_i \in R^{1 \times c}$ is a label of the ith multi-view instance, $y_i = [1, 0, 0]$ indicates that the number of classes of the ith multi-view instances $x_i$ is 1; $\alpha^v$ is the weight of each view; $W^v$ is a sample weight matrix of each view, and the present invention introduces the sample weight matrix; and the updated formulae of $P_g^v$ and $\alpha^v$ are as follows, setting $\tilde{W}^v = (W^v)^T W^v$:

$$P_g^v = [\lambda_3 I_{d^v} + (\alpha + \lambda_1)(X_g^v)^T \tilde{W}^v X_g^v]^{-1} [\alpha(X_g^v)^T \tilde{W}^v Y + \lambda_1 (X_g^v)^T \tilde{W}^v \Lambda^v] \quad (10)$$

$$\alpha^v = \frac{\exp(-\|W^v(X_g^v P_g^v - Y)\|_2/\lambda_3)}{\sum_{l=1}^{V+1} \exp(-\|W^v(X_g^l P_g^l - Y)\|_2/\lambda_3)} \quad (11)$$

converging to the local minimum through iterative optimizations (10) and (11), thereby obtaining the locally optimal solution.

4. The incomplete multi-view fuzzy system modeling method based on visible and hidden collaborative learning of claim 2, wherein step four specifically comprises:

according to the acquired hidden view and the imputed multi-view data, constructing an incomplete multi-view fuzzy system with collaborative learning in the present invention;

(3.1) determining the number K of fuzzy rules, and calculating antecedent parameters $e_i^k$ and $\delta_i^k$ of each view fuzzy system by using a VarPart clustering algorithm;

(3.2) mapping multi-view data into the fuzzy space based on the following function;

$$\mu(x) = \exp\left(\frac{-(x_i - e_i^k)^2}{2\delta_i^k}\right) \quad (8a)$$

$$\tilde{\mu}^k(x) = \frac{\mu^k(x)}{\sum_{k'=1}^{K} \mu^{k'}(x)} \quad (8b)$$

$$x_e = (1, x^T)^T \quad (8c)$$

$$\tilde{x}^k = \tilde{\mu}^k(x) x_e \quad (8d)$$

$$x_g = ((\tilde{x}^1)^T, (\tilde{x}^2)^T, \ldots, (\tilde{x}^K)^T)^T \quad (8e)$$

(3.3) Constructing the following objective function, and calculating the value of the objective function:

$$\min_{P_g, \alpha^v} \sum_{v=1}^{V} \alpha^v \|W^v(X_g^v P_g^v - Y)\|_2 + \quad (9)$$

$$\alpha^{V+1} \|H_g P_g^{V+1} - Y\|_2 + \lambda_1 \sum_{v=1}^{V} \|W^v(X_g^v P_g^v - \Lambda^{v+1})\|_2 +$$

$$\lambda_1 \|H_g P_g^{V+1} - \Lambda^{V+1}\|_2 + \lambda_2 \sum_{v=1}^{V+1} \alpha^v \ln \alpha^v + \lambda_3 \sum_{v=1}^{V+1} \|P_g^v\|_2$$

$$\text{s.t.} \sum_{v=1}^{V} \alpha^v = 1, \alpha^v > 0$$

where $X_g^v \in R^{N \times d_g^v}$ is the mapping of original data $X^v \in R^{N \times d^v}$ in the new feature space by fuzzy rules under the vth view, $H_g \in R^{N \times d_g^{v+1}}$ is the mapping of an original hidden view $H \in R^{N \times c}$ in the new feature space by the fuzzy rules, and $P_g^v$ is a consequent parameter of the vth view; $Y \in [y_1, y_2, \ldots y_N] \in R^{N \times C}$ is a label matrix of the multi-view data, where $y_i \in R^{1 \times C}$ is a label of the ith multi-view instance, $y_i = [1, 0, 0]$ indicates that the number of classes of the ith multi-view instances $x_i$ is 1; $\alpha^v$ is the weight of each view; $W^v$ is a sample weight matrix of each view, and the present invention introduces the sample weight matrix; and the updated formulae of $P_g^v$ and $\alpha^v$ are as follows, setting $\tilde{W}^v = (W^v)^T W^v$:

$$P_g^v = [\lambda_3 I_{d^v} + (\alpha + \lambda_1)(X_g^v)^T \tilde{W}^v X_g^v]^{-1} [\alpha(X_g^v)^T \tilde{W}^v Y + \lambda_1 (X_g^v)^T \tilde{W}^v \Lambda^v] \quad (10)$$

$$\alpha^v = \frac{\exp(-\|W^v(X_g^v P_g^v - Y)\|_2/\lambda_3)}{\sum_{l=1}^{V+1} \exp(-\|W^v(X_g^l P_g^l - Y)\|_2/\lambda_3)} \quad (11)$$

converging to the local minimum through iterative optimizations (10) and (11), thereby obtaining the locally optimal solution.

5. The incomplete multi-view fuzzy system modeling method based on visible and hidden view collaborative learning of claim 1, wherein the step five specifically comprises: obtaining the final output of the incomplete multi-view fuzzy system according to the following formula:

$$Y_{output} = \sum_{v=1}^{V} \alpha^v W^v X_g^v P_g^v + \alpha^{V+1} H_g P_g^{v+1}. \quad (12)$$

6. The incomplete multi-view fuzzy system modeling method based on visible and hidden view collaborative learning of claim 2, wherein the step five specifically comprises: obtaining the final output of the incomplete multi-view fuzzy system according to the following formula:

$$Y_{output} = \sum_{v=1}^{V} \alpha^v W^v X_g^v P_g^v + \alpha^{V+1} H_g P_g^{v+1}. \quad (12)$$

7. The incomplete multi-view fuzzy system modeling method based on visible and hidden view collaborative learning of claim 3, wherein the step five specifically comprises: obtaining the final output of the incomplete multi-view fuzzy system according to the following formula:

$$Y_{output} = \sum_{v=1}^{V} \alpha^v W^v X_g^v P_g^v + \alpha^{V+1} H_g P_g^{v+1}. \quad (12)$$

8. The incomplete multi-view fuzzy system modeling method based on visible and hidden view collaborative learning of claim 4, wherein the step five specifically comprises: obtaining the final output of the incomplete multi-view fuzzy system according to the following formula:

$$Y_{output} = \sum_{v=1}^{V} \alpha^v W^v X_g^v P_g^v + \alpha^{V+1} H_g P_g^{v+1}. \quad (12)$$

\* \* \* \* \*